(12) United States Patent
Bynum

(10) Patent No.: US 9,833,675 B2
(45) Date of Patent: Dec. 5, 2017

(54) BASEBALL BATTING TRAINER

(71) Applicant: ABOUT 52 FEET LLC, Santa Rosa, CA (US)

(72) Inventor: Maximilian T. Bynum, Santa Rosa, CA (US)

(73) Assignee: About 52 Feet, LLC, Santa Rosa, CA (US)

( * ) Notice: Subject to any disclaimer, the term of this patent is extended or adjusted under 35 U.S.C. 154(b) by 479 days.

(21) Appl. No.: 14/209,440

(22) Filed: Mar. 13, 2014

(65) Prior Publication Data

US 2015/0258402 A1    Sep. 17, 2015

(51) Int. Cl.
| | |
|---|---|
| *A63B 69/00* | (2006.01) |
| *A63B 71/06* | (2006.01) |
| *G06K 9/00* | (2006.01) |
| *H04M 1/725* | (2006.01) |
| *A63B 24/00* | (2006.01) |

(52) U.S. Cl.
CPC ...... *A63B 69/0002* (2013.01); *A63B 71/0619* (2013.01); *A63B 71/0622* (2013.01); *G06K 9/00342* (2013.01); *H04M 1/725* (2013.01); *A63B 24/0006* (2013.01); *A63B 2069/0008* (2013.01); *A63B 2071/065* (2013.01); *A63B 2071/0625* (2013.01); *A63B 2071/0647* (2013.01); *A63B 2071/0675* (2013.01); *A63B 2071/0683* (2013.01); *A63B 2071/0694* (2013.01); *A63B 2207/02* (2013.01); *A63B 2220/30* (2013.01); *A63B 2220/803* (2013.01); *A63B 2220/805* (2013.01); *A63B 2220/806* (2013.01); *A63B 2225/09* (2013.01); *A63B 2225/093* (2013.01); *A63B 2225/20* (2013.01); *A63B 2225/50* (2013.01)

(58) Field of Classification Search
None
See application file for complete search history.

(56) References Cited

U.S. PATENT DOCUMENTS

| | | | | |
|---|---|---|---|---|
| 4,583,733 | A * | 4/1986 | Ito | A63B 69/0002 434/247 |
| 2007/0021242 | A1 * | 1/2007 | Krickler | A63B 24/0021 473/451 |
| 2008/0182686 | A1 * | 7/2008 | Kellogg | A63B 69/0002 473/451 |

(Continued)

*Primary Examiner* — Dmitry Suhol
*Assistant Examiner* — Ankit Doshi
(74) *Attorney, Agent, or Firm* — Craig M. Stainbrook; Stainbrook & Stainbrook, LLP

(57) ABSTRACT

A batting swing trainer, including a laser for generating a laser beam, a photodetector spaced apart from the laser so as to define a swing space through which a batter swings a bat and for detecting and sensing disruptions in the laser beam, and a microcontroller. The system further includes a speaker for emitting audible signals in relation to which a batter attempts to time swings and a user interface for a user to input pitch data into the microcontroller. When a batter swings a bat through the swing space so as to disrupt said laser beam, the microcontroller detects and measures changes in the laser beam and calculates bat speed, a ball contact time, and the difference between the contact time and the target time, and then provides to the user a visual indication of the effect of the swing.

21 Claims, 7 Drawing Sheets

(56) References Cited

U.S. PATENT DOCUMENTS

2013/0143695 A1* 6/2013 Hart .................. A63B 69/0002
  473/458
2013/0218308 A1* 8/2013 Altshuler ................ G06F 19/00
  700/91

* cited by examiner

BASEBALL BATTING TRAINER

CROSS REFERENCES TO RELATED APPLICATIONS

Not applicable.
The present application is a first-filed United States Utility Patent Application.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The present invention relates generally to fine motor skill athletic training apparatus, and more particularly to training apparatus for hitting and striking motions involving a kinetic chain or sequence of muscle movements involving initial pelvic rotation, then sequentially trunk rotation, and finally shoulder and arm motions for propelling a held implement (such as a racket, club, or bat) into a ball or other object to be forcefully and accurately struck, and still more particularly to a batting tee having means for precisely calculating the accuracy with which a batter has struck a hypothetical pitch.

Background Discussion

The use of batting tees for training and practicing hitting in baseball is well known. The batting tee apparatus has been modified in various ways over many years, but the functional features of its fundamental design have remained essentially unchanged: the tee typically includes a vertical support—most often simply a post or pole—having a top shaped to support a baseball or softball. At its lower end, the batting tee is connected to a planar base, frequently shaped in the form of home plate, having sufficient ballast to keep the tee in an upright orientation even after being struck accidentally by the bat. The vertical support is often provided with means to adjust the height at which the ball support is disposed, so as to allow the user to tailor the apparatus for his or her body height or for the particular level of swing he or she wishes to make within the strike zone for that batter. In use, the batter simply assumes a stance in relation to a ball placed on the tee and swings the bat at the ball on the tee. While ball movement is entirely eliminated, the swing action sufficiently replicates the swing mechanics the batter would use in swinging at a pitched ball that the muscle and neurological training is considered highly effective.

The present invention provides baseball and softball players with an improved method for swing and hitting training with a batting tee. In a game situation, most pitchers attempt to challenge batters with pitches that are unpredictable in their velocity and path. Thus, pitchers generally develop a repertoire of pitches that vary in movement and speed. The fundamental challenges for the batter are, therefore, to predict the path of the ball as it will pass into and through the hitting zone, to predict when it will get there, and then to swing the bat with sufficient speed and on a path so as to contact the ball optimally to meet the hitting objective. Depending on the skill and the intention of the batter when playing (whether merely attempting to make contact or trying to precisely place a hit), the batter will endeavor to time his or her swing to contact the ball at an optimal point with an optimal bat swing path. Unpredictable pitches are intended to throw off (disrupt) the batter's timing, and when successful, a pitcher can entirely undermine the batter's ability even to make contact—thus the phenomenon of the strike out.

As noted, the use of a batting tee is a well-known and is a very popular approach to swing training. The tee presents a stationary ball and allows the batter to practice balance and swing mechanics while also allowing the batter to change the ball contact position relative to the batter's stance in a controlled fashion. By eliminating the time constraints and uncontrolled contact point inherent in hitting balls pitched by a human pitcher, a batter training with a tee is able to isolate and focus on swing mechanics in particular need of improvement. This applies to batters at all levels of ability, from beginners through Major League Baseball players.

However, while removing some uncertainties along with the urgency and other time constraints from the batting environment, that very advantage of tee training disadvantageously eliminates training for a fundamental and critically important challenge in batting, namely, timing the swing. The present invention is directed to providing a solution to this problem.

BRIEF SUMMARY OF THE INVENTION

The present invention provides a way to introduce a time constraint for a batter practicing with a tee: that way is by using a special audio signal. After the batter has taken his or her stance relative to the ball on a conventional ball tee, a pre-determined sustained or sequential audio signal is emitted from a speaker. The audio signal includes a rhythm in relation to which a batter can time his or her swing. The signal rhythm includes a change or simply point that signifies a target time known to the batter, and it is that point in time that represents the desired contact time for contact with the ball. The sustained or sequential audio signal may be determined by the user and must have an identifiable target time that may be either an interruption in the sustained signal or signal sequence (such as a count in a repeating rhythm), a change in the pitch or volume of the signal, or simply the end of the signal. The audio signal may consist of a simple sequence of discrete tones with linear or non-linear timing or it may consist of a short musical meme chosen by the user. The purpose of the audio signal is to quickly establish or induce a rhythm or beat in the mind of the batter to facilitate accurate temporal recognition of the target time. The time from the start of the audio signal to the target time of the audio signal is the "swing time," which is inversely proportional to the speed of a hypothetical pitched ball and includes, at a minimum, the predetermined time it would take for a pitch of a certain velocity to travel from a pitcher's hand to the contact point. However, as a general rule the selected time interval from hand to bat would be a minimum, and whatever interval the user may choose, he or she would not change this interval indiscriminately and without good reason. Even so, the user can choose the length of this interval to be shorter than the hand-to-bat interval for a given field size.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
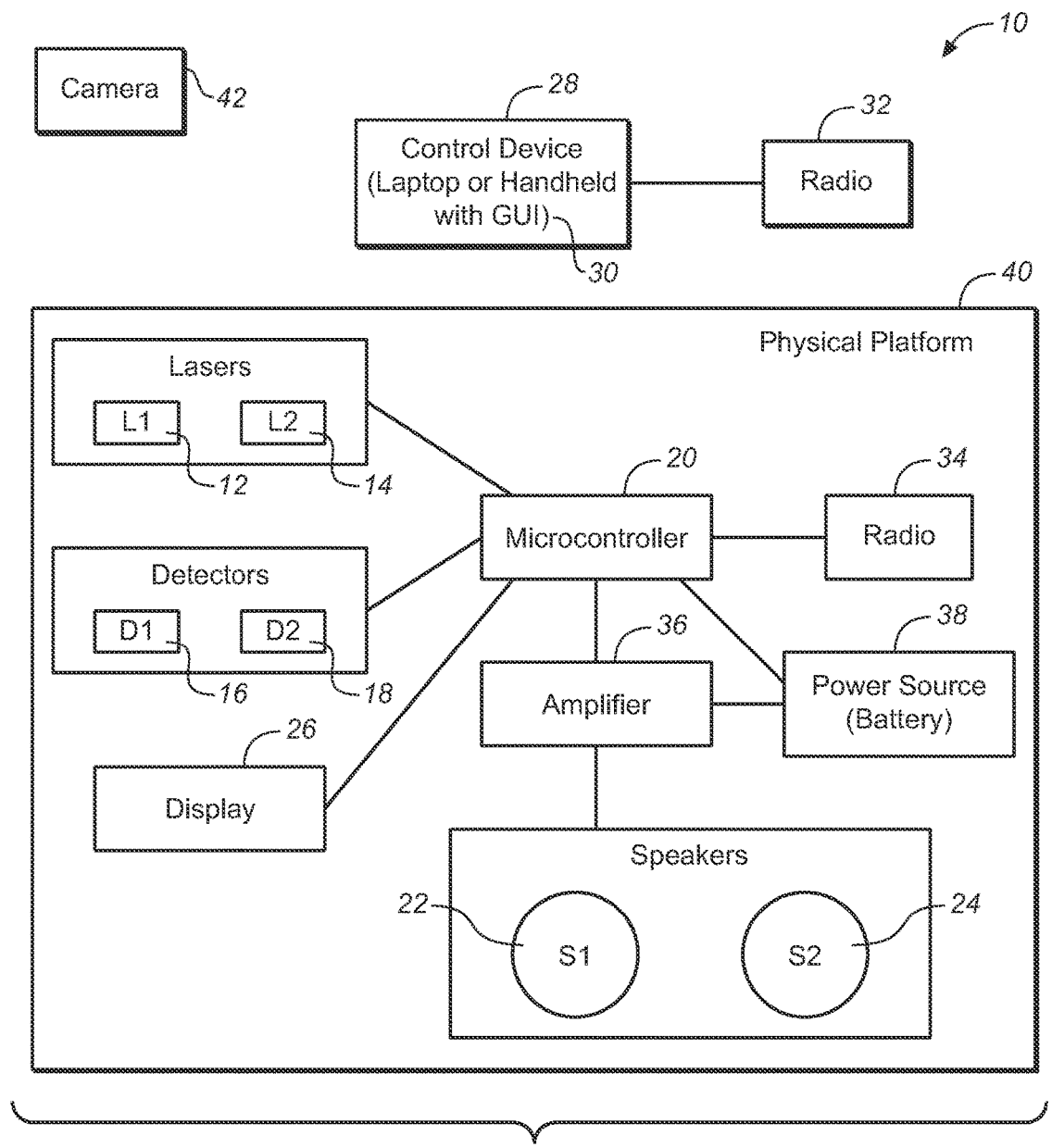
FIG. 1 is a schematic block diagram showing the elements comprising the batting trainer of the present invention.
Figure 2:
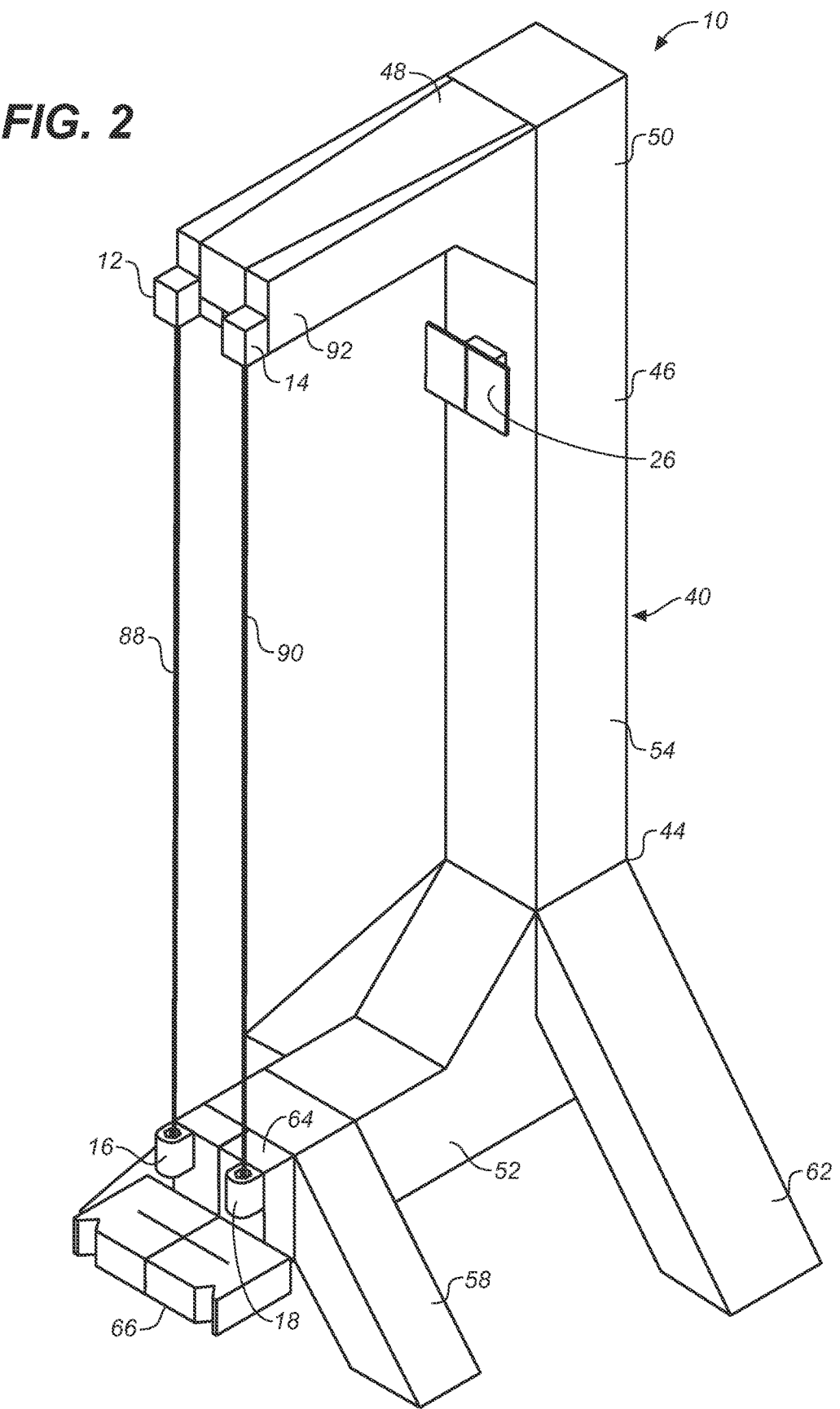
FIG. 2 is a highly schematic upper front right perspective viewing showing a preferred embodiment of the inventive swing tee platform using two lasers.
Figure 3:
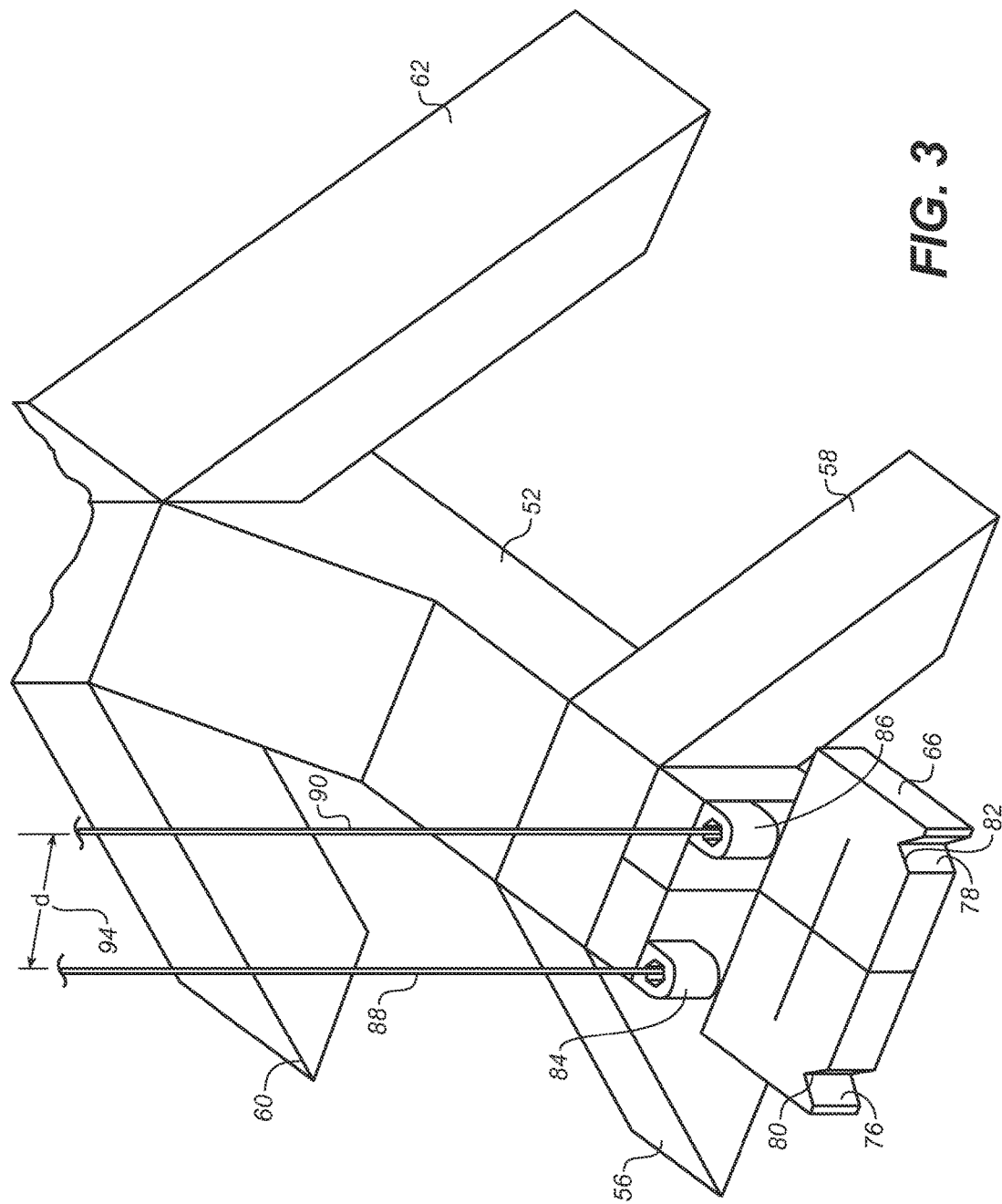
FIG. 3 is an upper front right perspective view showing details of lower front of the platform with the two photodetectors housed in the photodetector housings.
Figure 4:
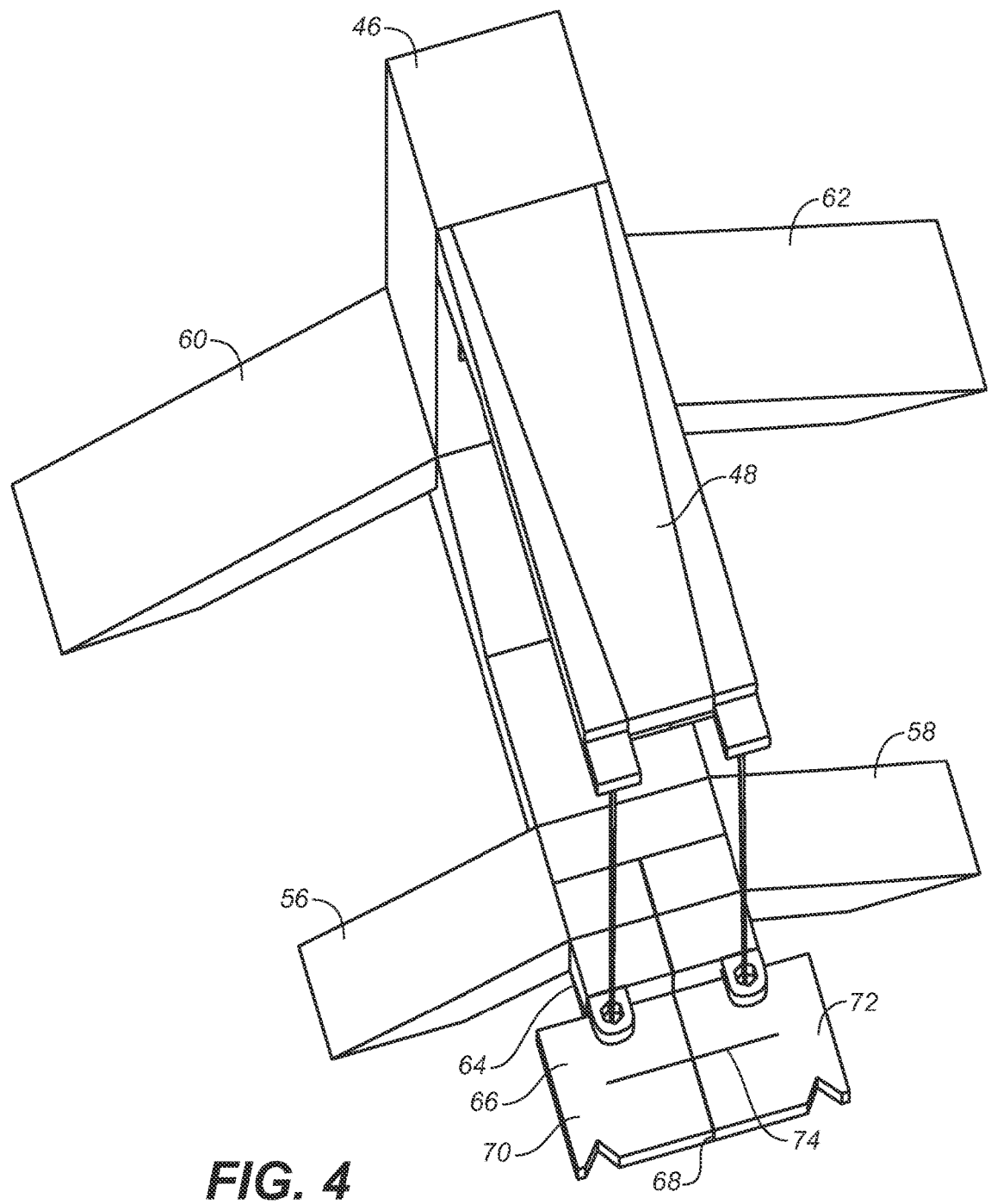
FIG. 4 is a top down upper front left perspective viewing showing two (first and second) lasers directing first and second beams down and into corresponding first and second photo detectors.

Referring first to FIG. 1, it will be seen that in its most essential aspect, the batting training apparatus of the present invention, generally referred to herein by reference number 10, includes the following components: (1) one or more lasers 12, 14; (2) one or more photodetectors, 16, 18, such as a laser photodiode sensor or other light sensor, one each for each laser and positioned to detect changes in the light intensity of beams produced by a laser; (3) one or more microcontrollers 20; (4) one or more speakers 22, 24, for emitting audible signals; (5) one or more visual displays 26; (6) a control device 28 (e.g., laptop, tablet computer, smartphone, or handheld multimedia device) having programmable memory for loading a system program, input means, and a graphical user interface 30 for user inputs; (7) microcontroller firmware (not shown); (8) control device software (not shown); (9) two or more combined wireless sending and receiving devices (transceivers), a first 32 located in and electrically connected with the control device 28, and a second 34 electrically connected to microcontroller 20, each using a standardized communications protocol, such as Bluetooth, IEEE 802.11, 802.15.1, 802.15.4, or the like, one etc.; (10) an amplifier 36 for the speakers; (11) a power source (e.g., a battery) 38 for system components, particularly including the amplifier and the microcontroller; and (12) a physical platform 40. Optional components may include: (13) a video camera 42, preferably one capable of high speed video for swing analysis.

Referring next to FIGS. 2-5, there is shown the platform and laser configuration employed in a preferred embodiment of the inventive swing tee. The platform 40 is preferably a standalone platform and includes display 26 mounted in front of the batter for immediate feedback. The platform structure comprises a base 44, which can be any of a number of suitable configurations and materials. The fundamental purpose is to provide a base for supporting a vertical support post 46 having an upper cantilevered arm 48 extending forwardly from the upper portion 50 of the vertical post. The base includes a lower arm 52 disposed in a horizontal orientation and extending forwardly from a lower portion 54 of the vertical support post. Front legs 56, 58, extend outwardly and angle downwardly from the lower arm, and rear legs extend outwardly and angle downwardly from the lower portion of the vertical post. Collectively, the base elements have sufficient weight to provide a kind of ballast for the entire apparatus, so as to keep the apparatus in a generally upright position under most circumstances reasonably expected to be encountered during use. The front portion, or outer end, 64, of the lower arm includes a tee guide 66 having alignment markings, including a center line 68 geometrically bisecting the tee into left and right halves 70, 72, respectively, and a pitch line 74, which is aligned with or slightly offset and parallel to a hypothetically perfectly straight pitch from a pitcher. The tee guide further includes left and right V-shaped notches 76, 78, each having a vertex 80, 82 showing a properly centered position for the tee for either a right handed or left-handed batter, the left V being used for a right handed batter and the right V being used for a left handed batter.

It will be appreciated that the tee guide is disposed in a slightly spaced apart relationship and immediately under photodetector housings 84, 86, each of which contains a photodetector 16, 18, each for detecting the presence of and the interruption of a laser beam 88, 90 generated by a laser 12, 14 disposed and housed at the outer end 92 of upper arm 48. In a preferred embodiment, when two lasers and laser beams 88, 90 are employed for measuring the relevant data pertaining to a swing event, the beams are spaced by a predetermined distance 94. In relation to the tee guide, if the beams were permitted to pass through the photodetectors, it would be seen that a line extending normal to the pitch line from each vertex would be approximately 1.5 inches from the point of laser beam contact with the tee guide in the direction of bat movement through the laser beams; this distance is roughly the radius of a baseball.

Figure 5:
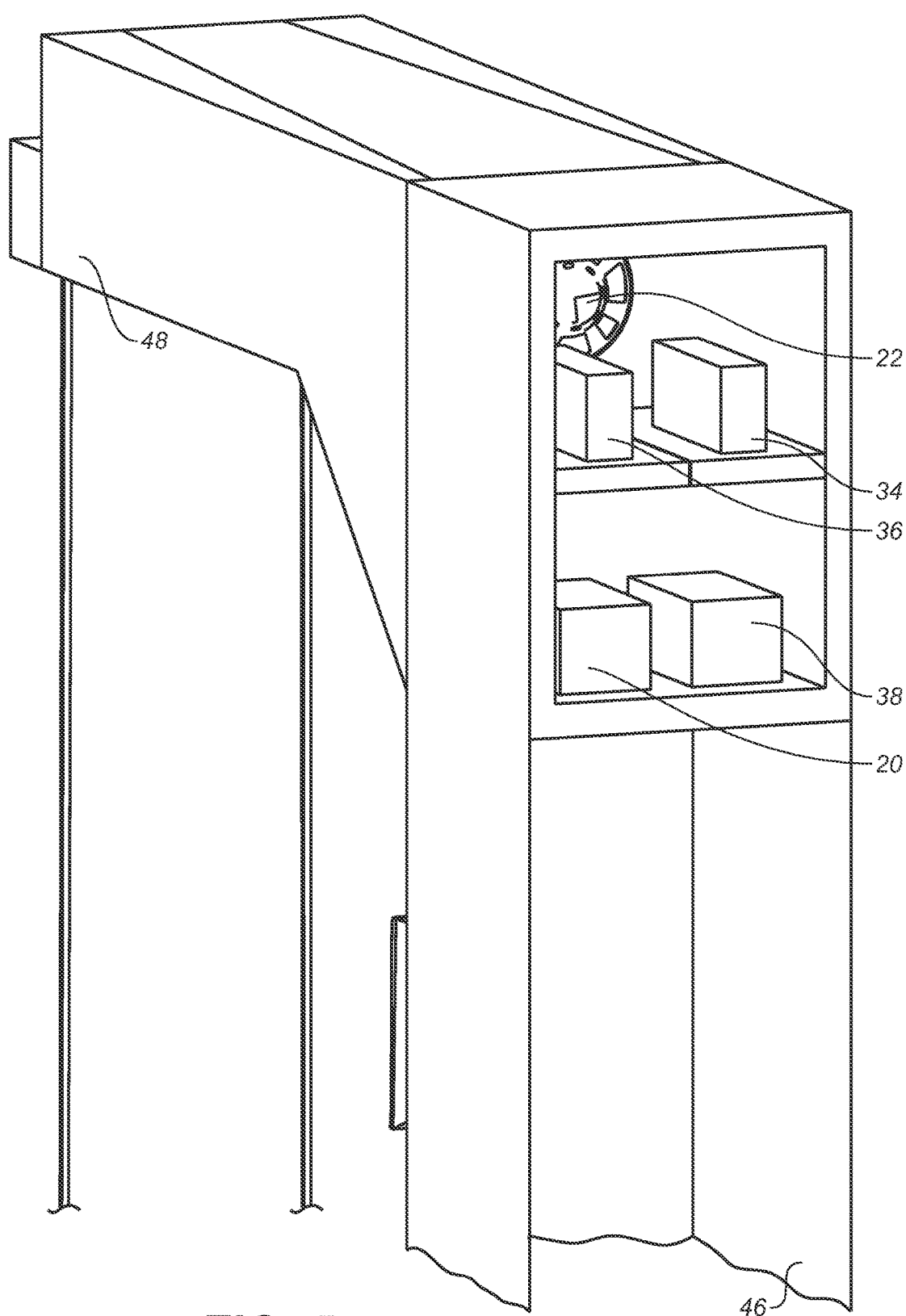
FIG. 5 is an upper right rear perspective view of the platform showing the electronic hardware compartment and the components contained therein, as well as one of the system speakers.

Referring specifically now to FIG. 5, there is shown an upper right rear perspective view the electronic hardware compartment and the components contained therein, as well as one of the system speakers. System components in the hardware compartment include the platform transceiver 34, the speaker amplifier 36, the system power source (battery) 38, a speaker 22, and the microcontroller 20.

In use, a batter will generally utilize the inventive swing trainer in conjunction with a conventional batting tee. The batter sets up and adjusts the tee and then places the inventive swing training device with the upper and lower arms positioned such that the contact side of the ball placed on the tee is lined up with the second laser (right or left depending on whether the batter is right or left handed). The batter continues hitting balls as before but with the additional audio signal provided by the inventive apparatus. He or she continues to hit the physical ball, but now with swings timed so as to correspond with the target time, as dictated by the audio output. The physical ball provides visual information about contact quality, and the inventive training device provides information about whether the swing was early or late in relation to the target time. Thus, whereas while using a physical tee alone the batter may produce extremely well hit balls, it remains unknown whether the swing would have been early or late in relation to a moving ball. By using the swing trainer of the present invention, the batter is provided with a visual display showing the trajectory as being in foul territory, or perhaps even a complete miss according to the equations of motion of the hypothetical ball and the bat.

Figure 6:
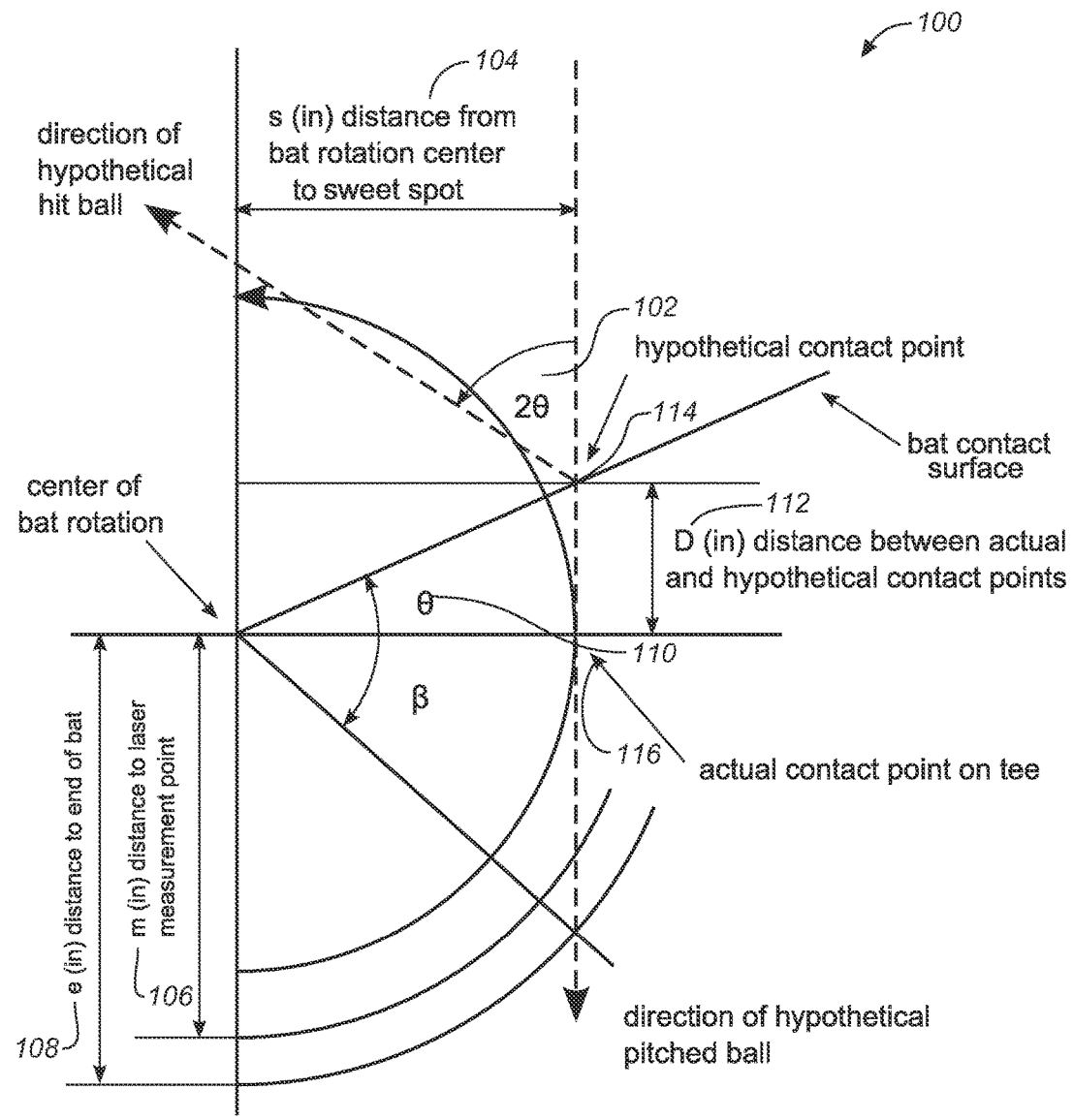
FIG. 6 is a highly schematic diagram graphically depicting a top plan view of the geometry at the foundation of system calculations.

Thus, and referring now to FIG. 6, there is shown a graphic representation 100 of the geometry and mathematical factors used by the system software to calculate a user's contact point and direction of hit when using the inventive batting tee, as well as the results of an exemplary calculation. To begin use, the user first determines the basis for calculating the swing time by inputting into the control device a pitch speed and a delivery point to contact point distance. As an example, the user may decide on the approximate distance a pitched ball travels from the pitcher's hand to the contact point on a batter's bat on a full sized diamond, e.g., 52 feet, and may arbitrarily choose an average pitch speed of 72 mph (i.e., a pitch having an average velocity of 72 mph from hand to bat) for an imaginary pitched ball. The resulting swing time would be 492 milliseconds. The user may then choose an audio signal to be introduced in four tones equidistantly (equi-temporally) spaced, and the audio signal would thus consist of four tones spaced 164 milliseconds apart with the final tone taking place at a time corresponding to the target time, that is, the time at which the batter would be attempting to make contact with the ball. The inventive system determines the contact time by taking the point at which the leading edge of the bat breaks the beam from a laser lined up so as to correspond with the contact point. In this way, the elapsed time between the target time and the actual contact time can be precisely measured. If a single laser and laser beam are used, the speed of the bat passing through the laser beam is measured by dividing the diameter of the bat by the length of time the laser beam is blocked. In such a case, the user is required to enter the diameter of the bat in this embodiment. In another embodiment, when at least two lasers and laser beams are employed, bat speed is measured without any need to input a bat diameter.

A display 26 located on the platform 40 (see FIGS. 2-5) provides the batter with immediate visual indications about the most recent swing. The indications include a schematic graphical representation comprising a portion of 100 (FIG. 6) of the angle 102 the ball would have been hit on a baseball diamond (the direction it would have traveled) with the given imaginary pitched ball speed, the measured bat speed, and the measured elapsed time between the target time and the actual time of contact.

Thus, for example, if the bat breaks the laser beam late or after the target time, a "real world" ball would have been hit to the right side of the field for a right handed batter. Conversely, if the bat breaks the laser beam early (i.e., before the target time, as shown in FIG. 6), a real world ball would have been hit to the left side of the diamond for a right-handed batter. The angle of the hypothetical pitched ball's trajectory after being hit by the bat is estimated by using the hypothetical pitched ball speed and the measured data.

The user must input the following data: 1) hypothetical pitch speed P (mph); 2) hypothetical distance of ball travel, 3) distance from center of bat rotation to sweet spot, S (in) 104; 4) distance from center of bat rotation to position of laser measurement, M (in) 106; and 5) distance from center of bat rotation to end of bat, E (in) 108.

The following data are measured by the apparatus: 1) bat speed, B (degrees/ms); 2) contact time, T (ms) (ΔT=contact time−target time).

Equation (1) relates bat angle θ 110 and the distance, D 112, of the hypothetical contact point 114 from the actual contact point 116 on the tee.

$$\tan\theta = D/S \qquad \text{Equation (1)}$$

substituting θ=Bt $$\tan(Bt) = D/S \qquad \text{Equation (2)}$$

(This is true for "on-time" swing since both t and D equal zero at target time.)

The target time corresponds to t=0. The difference between the measured contact time and target time is ΔT where ΔT>0 for late swings and ΔT<0 for early swings. ΔT is added to Equation 2 to represent late or early swings.

$$\tan[B(t-\Delta T)] = D/S \qquad \text{Equation (3)}$$

solving for D $$D = S \tan[B(t-\Delta T)] \qquad \text{Equation (4)}$$

Equation of motion of hypothetical pitched ball:

$$D = -Pt \qquad \text{Equation (5)}$$

Equations (4) and (5) are solved numerically for D and t. D is substituted into Equation (1) and solved for θ to obtain the angle of the bat at time of hypothetical contact.

$$\theta = \arctan(D/S)$$

From FIG. 6, it can be seen that the angle the ball is hit 102 off a bat at angle ±θ is ±2θ. Also from FIG. 6, it can be seen that any bat angle at hypothetical contact less than −β and greater than β will not make contact with the ball because the swing would have been too late or too early, respectively.

Example results:
User input:
P: 72 mph->1.267 in/ms
S: 22 in
M: 28 in
E: 30 in
Measured data:
B: 65 mph->2.34 degrees/ms
ΔT: −8 ms
Result for D at impact: 4.23 inches
Result for t at impact: −3.34 milliseconds This means that the hypothetical pitched ball would have been struck 4.23 inches in front (beyond tee towards pitcher) of the intended impact point 3.34 milliseconds earlier than the intended impact time. Contact at the intended contact time would have propelled the ball straight forward towards the pitching mound.

The angle of the bat at contact calculated as $$\theta = \arctan(4.23/22) = 10.9 \text{ degrees}$$

Therefore, the hypothetical ball would have been hit 21.8 degrees from center into left field for a right handed batter.

Calculation of β

From FIG. 6

$$\cos \beta = S/E \quad \text{Equation (6)}$$

solving for $\beta$, $$\beta = \arccos(S/E) \quad \text{Equation (7)}$$

D can be calculated from $\beta$, $$\sin \beta = D/E \quad \text{Equation (8)}$$

$$D = E \sin \beta \quad \text{Equation (9)}$$

substitute $\beta$ from Equation (7), $$D = E \sin [\arccos(S/E)] \quad \text{Equation (10)}$$

For this example, $$D = 30 \sin [\arccos(22/30)] = 20.39 \text{ inches}$$

For early swings, solving Equation (5) for t, $$t = -D/P = -20.39/1.267 = -16.1 \text{ ms}$$

substituting into Equation (4) and solving for $\Delta T$, $$\Delta T = t - [\arctan(D/S)]/B = -16.1 - [\arctan(20.39/22)]/2.34 = -34.4 \text{ ms}$$

For late swings, solving Equation (5) for t, $$t = -D/P = 20.39/1.267 = 16.1 \text{ ms}$$

substituting into Equation (4) and solving for $\Delta T$, $$\Delta T = t - [\arctan(D/S)]/B = 16.1 - [\arctan(-20.39/22)]/2.34 = 34.4 \text{ ms}$$

Therefore, for this example, a measured $\Delta T < -34.4$ ms would indicate a swing too early to make contact with the hypothetical pitched ball, and a measured $\Delta T > 34.4$ ms would indicate a swing too late to make contact with the hypothetical pitched ball.

Figure 7:
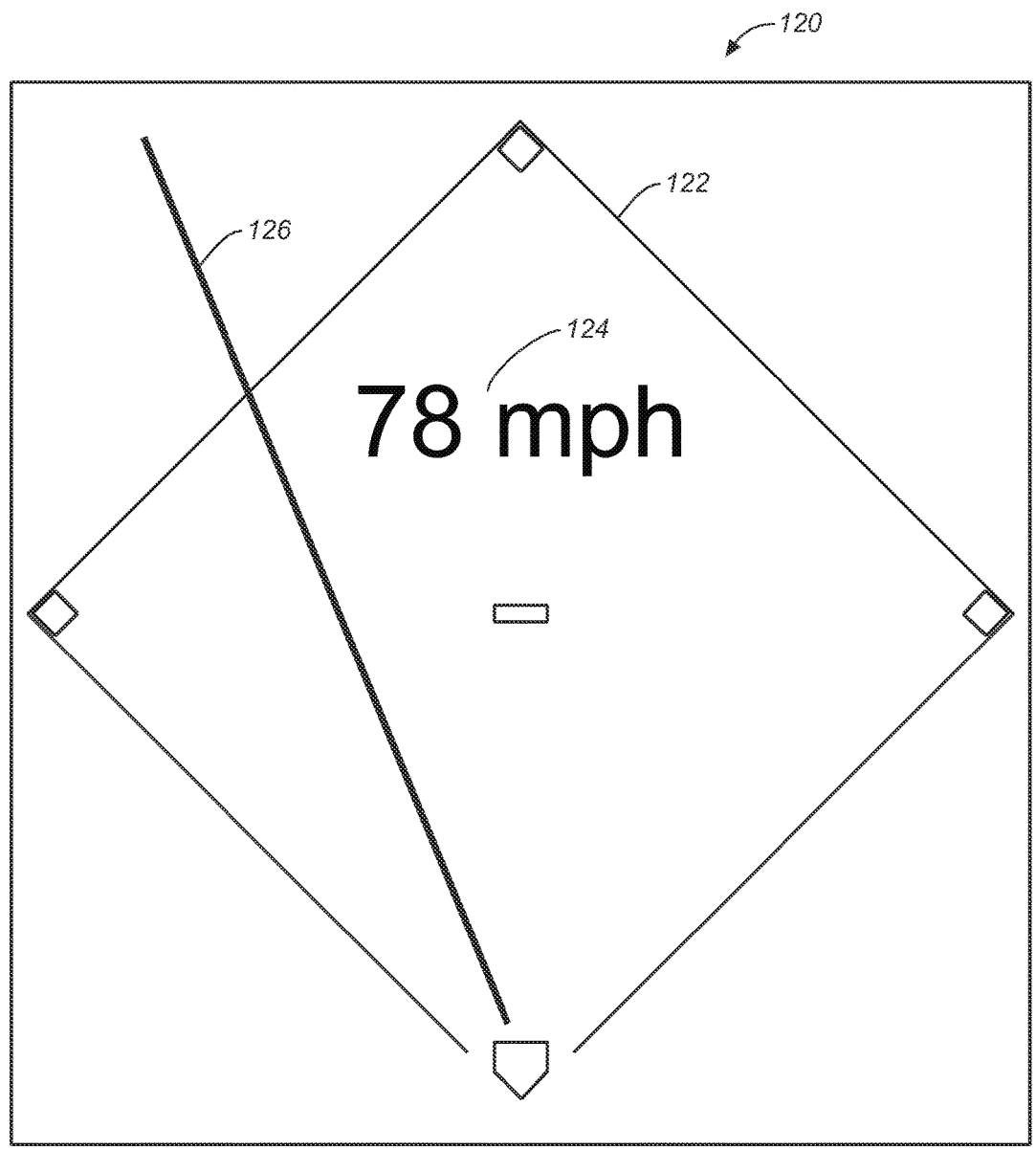
FIG. 7 is a schematic top plan view of a visual display output showing a selected pitch speed and a system-calculated direction of a hit.

FIG. 7 shows a simplified display 120 providing immediate feedback to the batter, showing a baseball diamond 122, calculated bat speed for each swing 124, and a graphical representation of where the hypothetical ball would have been hit 126, which indicates how late or how early the swing was. The control device is able to display the same information as well as other information according to user settings.

It will be appreciated that the hitting zone for the inventive batting trainer is defined as the space between the upper and lower arms, which is the space in or proximate which a ball on a conventional batting tee may be positioned. Means for adjusting the position and height of this space can be provided either through means to adjust the space between the arms, for instance by providing a vertical support post with length adjustment features disposed between the upper and lower arms, and/or by providing legs of adjustable height. Such means including, for instance, a telescoping vertical support post, telescoping legs, or length and height adjustment elements that can be added or removed from the vertical support post or legs so as to add or subtract from the length of these features. Such means are so well known in the art that they need not be described in detail herein.

It will be further appreciated that the standalone platform 40 described above is but one of many possible structures suitable for configuring a spaced-apart laser and photodetector combination adapted to detect and analyze bat swings. The upper and lower arms, for instance, could be cantilevered outwardly from a permanent fixture such as a wall or post and could even be provided with a pivotal and vertically adjustable to such a permanent fixture using means well known in the art. Alternatively, the laser and photodetector could be mounted in an opposing relationship in the ceiling and floor of a room dedicated to swing training, with the laser beam thus spanning the space between the ceiling and floor. While the standalone platform has the advantage of versatility and transportability, it is not essential to the invention.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A batting swing trainer, comprising:
   at least one laser for generating a laser beam;
   at least one photodetector spaced apart from said at least one laser so as to define a swing space through which a batter swings a bat and for detecting and sensing disruptions in said laser beam;
   a microcontroller having temporary memory;
   a computer-executable program loadable into said temporary memory that calculates a target time based on pitch speed and delivery point-to-contact point distance;
   a speaker for emitting audible signals in relation to which a batter attempts to time swings, said audible signal or a disruption in said audible signal signifying said target time;
   a user interface for a user to input data into said microcontroller a pitch speed and a delivery point-to-contact point distance;
   an electronic visual display driven by said microcontroller for providing the user with a visual indication of the swing calculations made by said microcontroller; and
   a power source connected to said microcontroller and said electronic visual display;
   wherein when a batter swings a bat through said swing space so as to disrupt said laser beam, said microcontroller detects and measures changes in said laser beam and calculates bat speed, a ball contact time, and the difference between the contact time and the target time, and then provides to the user a visual indication of the effect of the swing;
   wherein said swing trainer further includes a tee guide having alignment markings for orienting a ball tee in relation to said laser beams for both right and left handed batters.

2. The batting swing trainer of claim 1, wherein said microcontroller is a programmable microcontroller that includes a core processor, permanent memory for storing a program, temporary memory for loading and running a computer-executable program, program loading means to load a computer-executable program onto the microcontroller, and a visual display subsystem.

3. The batting swing trainer of claim 1, wherein said computer-executable program enables the user to select an audible output to be produced through said speaker to signify a target time.

4. The batting swing trainer of claim 1, wherein after a swing event, said visual display provides a top plan view of the direction of the hit on a schematic baseball diamond.

5. The batting swing trainer of claim 1, wherein said at least one laser and said at least one photodetector are mounted on a standalone platform.

6. The batting swing trainer of claim 5, wherein said standalone platform includes a base, a vertical support, a lower arm and an upper arm spaced apart from said lower arm, and wherein said at least one laser is disposed in either said upper arm or said lower arm and said at least one photodetector is disposed in the other of either said upper arm or said lower arm.

7. The batting swing trainer of claim 1, further including a video camera.

8. The batting swing trainer of claim 1, wherein said batting swing trainer further includes a first radio transceiver electrically connected to said microcontroller and a control device physically separate from said platform through which a user provides user inputs.

9. The batting swing trainer of claim 8, wherein said control device is selected from the group comprising a laptop computer, a tablet computer, a smartphone, or a handheld multimedia device.

10. The batting swing trainer of claim 9, wherein said control device includes programmable memory for loading a system program, input means, and a graphical user interface for user inputs.

11. The batting swing trainer of claim 10, wherein said control device includes programmable memory for loading a system program, input means, and a graphical user interface for user inputs.

12. The batting swing trainer of claim 8, wherein said control device includes programmable memory for loading a system program, input means, and a graphical user interface for user inputs.

13. The batting swing trainer of claim 12, wherein said control device includes a second radio transceiver in electronic communication with said first radio transceiver.

14. The batting swing trainer of claim 13, wherein said first and second transceivers are in wireless communications through standardized communications protocol.

15. The batting swing trainer of claim 14, wherein said communications protocol is selected from the group consisting of Bluetooth, IEEE 802.11, 802.15.1, and 802.15.4.

16. The batting swing trainer of claim 1, wherein said swing trainer includes two lasers and two photodetectors, one for each laser.

17. The batting swing trainer of claim 1, wherein said microcontroller is provided with software including computer-executable instructions to enable a user to select an audio signal to be output through said speaker, said audio signal including a signal output or a disruption in signal output taking place at a time corresponding to the target time.

18. The batting swing trainer of claim 17, wherein said microcontroller determines the contact time by taking the point at which the leading edge of the user's bat breaks the laser beam from one of said at least one lasers having a beam aligned so as to correspond with a contact point.

19. The batting swing trainer of claim 18, wherein one laser is included and said microcontroller calculates bat speed by dividing the diameter of the bat by the length of time the laser beam is blocked, and wherein the user must input the diameter of the bat.

20. The batting swing trainer of claim 1, wherein at least two lasers are included providing spaced apart beams detected by spaced apart photodetectors, and wherein said microcontroller calculates bat speed without the need to input a bat diameter.

21. The batting swing trainer of claim 1, wherein said platform includes an electronic hardware compartment for storing system components including at least said microcontroller.

* * * * *